Oct. 29, 1968   R. DEVIME ET AL   3,408,528
COMPOSITE ELECTRODE STRUCTURE FOR MAGNETOHYDRODYNAMIC DEVICE
Filed March 9, 1965

INVENTORS
ROBERT DEVIME
DAVID YEROUCHALMI
BY Bacon & Thomas
ATTORNEYS

United States Patent Office 3,408,528
Patented Oct. 29, 1968

3,408,528
COMPOSITE ELECTRODE STRUCTURE FOR
MAGNETOHYDRODYNAMIC DEVICE
Robert Devime, Rueil-Malmaison, and David Yerouchalmi, Issy-les-Moulineaux, France, assignors to Commissariat a l'Energie Atomique, Paris, France, and Institut Francais du Petrole des Carburants et Lubrifiants, Rueil-Malmaison, Hauts-de-Seine, France
Filed Mar. 9, 1965, Ser. No. 438,343
Claims priority, application France, Mar. 24, 1964, 968,517
7 Claims. (Cl. 313—352)

ABSTRACT OF THE DISCLOSURE

The invention relates to a composite electrode for use in a magnetohydrodynamic generator. The electrode is structurally comprised of a plurality of flat sided segments of refractory oxide spaced apart in side to side relationship and fixed together to form a composite unit by joints of noble or inert refractory metal. The aligned array of the front faces of the segments contacts the ionized gas of the generator, forming a thin conductive layer of material which resists corrosion and oxidation at the high operating temperature. The array of back faces of the segments serves as an excellent collector since the refractory metal joints form a conductive path between the two faces of the segments.

---

The present invention relates to a composite electrode and a method for manufacturing said electrode.

The composite electrode in accordance with this invention is intended to operate in a region in which very high temperatures prevail and more particularly in a region in which it is required to establish a flow of electric current between a fluid at high temperature and a conductor at low temperature as is the case, for example, within the channel of a magnetohydrodynamic (MHD) conversion generator.

It is known that the electrodes of a magnetohydrodynamic converter must satisfy very stringent operating conditions, viz:

They must be capable of withstanding high temperatures (of the order of 2,000 to 3,000° K.).

They must not corrode in an oxidizing atmosphere.

They must be electrically conductive.

Consideration has been given to the possibility of employing stabilized refractory oxides such as zirconia and thoria. Unfortunately, these oxides are not electrically conductive unless they are heated to high temperatures. An electrode for a magnetohydrodynamic converter cannot therefore consist solely of a refractory oxide by reason of the fact that, above a certain thickness, the oxide would not be at a sufficiently high temperature to be conductive. In fact, it is known that, in a magnetohydrodynamic conversion generator, the electrodes which usually have the shape of a plate are heated only on one face, namely that face which is in contact with the ionized gas.

Refractory metals do not prove to be more suitable for the fabrication of electrodes employed in magnetohydrodynamic converters since they oxidize very rapidly in contact with the ionized gas.

The composite electrode in accordance with the invention overcomes the disadvantages which have been mentioned above and the use of said electrode in a magnetohydrodynamic converter is particularly advantageous. The method of manufacturing said electrode, as will be explained below, is particularly simple, rapid and economical.

The composite electrode in accordance with the invention consists of an assembly of segments of refractory oxides which are joined to each other by means of a joint formed of a noble or inert refractory metal.

The method of fabrication of a composite electrode in accordance with the invention is essentially characterized in that the faces of a segment of refractory oxide are coated with a dispersion of powder of noble or inert refractory metal, in that a plurality of said segments coated with said dispersion are assembled together with their largest faces in contact, and in that said segments are subjected to a baking process.

Platinum, iridium, platinum-rhodium alloy and iridium-rhodium alloy are particularly well suited to the formation of the dispersion. The segments are formed of refractory oxides which can either be zirconia or thoria and which can be stabilized if necessary. Preference is given to the use of oxides which have a density of the order of 85 to 90% of theoretical and which have a low porosity.

In accordance with one of the important characteristic features of the invention, the metal dispersion with which the segments are coated can be replaced by a very thin foil of noble or inert refractory metal; the foils can have thicknesses of $1/100$ to $30/100$ mm., for example.

There will now be described in greater detail a composite electrode in accordance with the invention as well as the method of fabrication thereof. In the description which follows hereinafter, reference will be made to FIGS. 1, 2 and 3 of the accompanying drawings, wherein.

Figure 1:
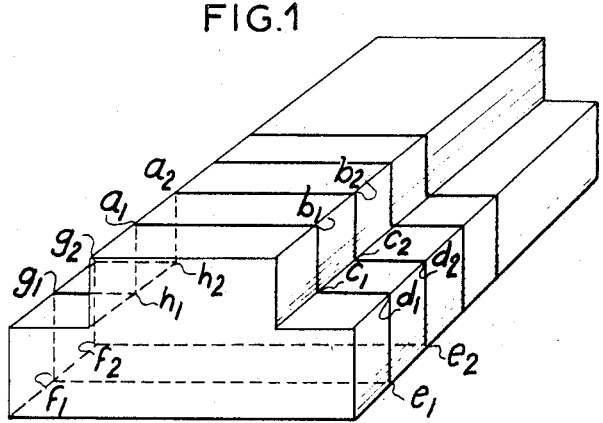
FIG. 1 represents a view in perspective of a composite electrode in accordance with the invention.

There have been shown in FIG. 1 a certain number of segments which form the electrode, such as the segment $a_1 \, b_1 \, c_1 \, d_1 \, e_1 \, f_1 g_1 \, h_1$, $a_2 \, b_2 \, c_2 \, d_2 \, e_2 \, f_2 \, g_2 \, h_2$. These segments are assembled together with their large faces in contact. The joint faces must have a plane and uniform surface, and are usually surfaced by molding with a dimensional tolerance of $1/100$ mm.

Figure 2:
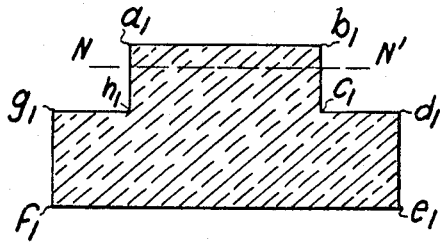
FIG. 2 is a front view of a segment.

FIG. 2 represents a joint face, for example, $a_1 \, b_1 \, c_1 \, d_1 \, e_1 \, f_1 \, g_1 \, h_1$, to which is applied a dispersion of very fine powder of a noble refractory metal, for example, platinum, iridium or platinum-rhodium and iridium-rhodium alloys or of inert refractory metal such as niobium, tantalum, molybdenum or tungsten. The liquid constituent of the dispersion can be any liquid of such nature as to volatilize or decompose under the action of heat. However, the liquid constituent adopted will as a rule be a resin dissolved in an organic solvent such as a solution of a polymer.

Figure 3:
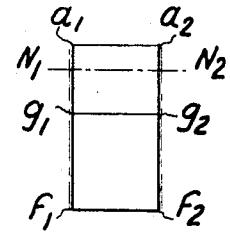
FIG. 3 is a side view of said segment.

FIG. 3 is a side view of the segment $a_1 \, b_1 \, c_1 \, d_1 \, e_1 \, f_1 \, g_1 \, h_1$—$a_2 \, b_2 \, c_2 \, d_2 \, e_2 \, f_2 \, g_2 \, h_2$, wherein the faces $a_1 \, a_2 \, h_1 \, h_2$, $h_1 \, h_2 \, g_1 \, g_2$, $g_1 \, g_2 \, f_1 \, f_2$ of said segment are not coated with the metal dispersion.

The segments which are intended to constitute the electrode and which are thus coated with the metal dispersion are assembled together in the arrangement which is illustrated in FIG. 1 in such a manner that the large faces thereof are juxtaposed.

In a first form of embodiment of the method in accordance with the invention, the segments which are already coated with the metal dispersion are subjected separately and prior to assembly to a baking process, the heating temperature being moderate but nevertheless sufficient to ensure that this first baking process results in sufficient adhesion of the metal particles to the faces of the segment. This temperature is of the order of 850° C. The segments are then assembled together as has been previously explained and subjected to a second baking process in such a manner as to bond the different segments together.

In a preferred form of embodiment of the invention, the segments are subjected to a single baking process after assembly so as to produce the adhesion of the metal powder and to bond the different segments together. After baking, the thickness of the metal layer is preferably within the range of 3 to 6μ.

In the case in which the metal dispersion is replaced by a thin metal foil, an excellent bond is formed between the segments after a single baking process.

The heating process is carried out in an inert atmosphere if inert refractory metals are employed such as niobium, tantalum, molybdenum, tungsten and is carried out in a reducing atmosphere if noble refractory metals are employed such as platinum, rhodium, iridium or the alloys of platinum-rhodium and iridium-rhodium.

A composite electrode which is designed in accordance with the invention and placed in the channel of a magnetohydrodynamic converter operates as follows:

When an electrode of the type shown in FIG. 1 is placed in a magnetohydrodynamic conversion system, only the top face of said electrode is in contact with the ionized gas which is brought to very high temperatures, usually within the range of 2,000 to 3,000° K. In a first zone which comprises the current-receiving zone, the refractory oxide is heated to a high temperature and is the main current-conductor. Starting from a certain level which is designated respectively by NN' in FIG. 2 and by $N_1N_2$ in FIG. 3, the refractory oxide is no longer at a sufficiently high temperature to be capable of conducting the electric current; accordingly, the transmission of electric current is ensured above this level by means of the metal joints which bond the different segments to each other. The underface of the electrode, also metallized, will serve as a current collector.

The electrode assembly as hereinabove described offers substantial advantages, viz:

The said assembly can be performed both rapidly, simply and economically,

By virtue of said assembly, it is possible to produce an electrode having the desired dimensions, density and porosity, The assembly admits of different linear coefficients of thermal expansion without entailing any risk of breakage of portions which are formed of ceramic material.

Moreover, it should be noted that the metal joints obtained have high strength and the thickness of said joints can be adjusted with precision, simply by modifying the quantities of metal applied by spraying on the large faces of the segments.

What we claim is:

1. An electrode for a magnetohydrodynamic device comprising a plurality of segments of refractory oxide fixed in juxtaposed relationship by refractory metal joints.

2. An electrode as described in claim 1 wherein the refractory oxide is selected from the group consisting of zirconia and thoria.

3. An electrode as described in claim 1 wherein the refractory metal is a noble refractory metal selected from the group consisting of platinum, iridium, platinum-rhodium alloy, and iridium-rhodium alloy.

4. An electrode as described in claim 1 wherein the refractory metal is an inert refractory metal selected from the group consisting of niobium, tantalum, molybdenum and tungsten.

5. An electrode for a magnetohydrodynamic device comprising:
 a plurality of flat sided segments of refractory oxide, each said segment having a first and a second face;
 said segments being spaced in side to side relationship and fixedly joined by refractory metal joints to present an aligned array of said first segment faces to contact ionized gas in said device and an aligned array of said second segment faces to form a current collector in said device;
 whereby said refractory metal joints form a conductive path between said first faces and said second faces at the operating temperature of said device.

6. An electrode as described in claim 5 wherein said refractory metal joints are comprised of foil having a thickness in the range of 0.01 mm. to 0.30 mm.

7. An electrode as described in claim 5 wherein said refractory metal joints comprise a baked dispersion of powdered metal and resin.

References Cited

UNITED STATES PATENTS

| | | | |
|---|---|---|---|
| 3,149,253 | 9/1964 | Luebke | 313—346 X |
| 3,183,380 | 5/1965 | Hurwitz et al. | 310—11 |
| 3,274,408 | 9/1966 | Louis | 313—246 X |
| 3,169,200 | 2/1965 | Huffman | 313—250 X |

JOHN W. HUCKERT, *Primary Examiner.*

A. J. JAMES, *Assistant Examiner.*